United States Patent [19]
Burt et al.

[11] Patent Number: 5,769,918
[45] Date of Patent: Jun. 23, 1998

[54] METHOD OF PREVENTING GLASS ADHERENCE

[75] Inventors: Sandra L. Burt, Horseheads; Robert S. Pavlik, Jr., Corning, both of N.Y.

[73] Assignee: Corning Incorporated, Corning, N.Y.

[21] Appl. No.: 928,572

[22] Filed: Sep. 12, 1997

Related U.S. Application Data

[60] Provisional application No. 60/028,738 Oct. 24, 1996.

[51] Int. Cl.⁶ .................................................. C03B 19/06
[52] U.S. Cl. ................................................. 65/17.3; 65/26
[58] Field of Search ........................... 65/17.1, 17.3, 65/24, 26

[56] References Cited

U.S. PATENT DOCUMENTS

| | | | |
|---|---|---|---|
| 2,466,849 | 4/1949 | Hood | 501/66 |
| 2,795,084 | 6/1957 | Littleton | 65/24 |
| 3,208,839 | 9/1965 | Nordberg | 65/24 |
| 4,559,797 | 12/1985 | Raymond | 72/63 |
| 4,678,115 | 7/1987 | Weisert | 228/183 |
| 5,073,181 | 12/1991 | Foster et al. | 65/24 |
| 5,250,360 | 10/1993 | Andrus et al. | 428/471 |
| 5,358,913 | 10/1994 | Chatterjee et al. | 501/103 |
| 5,361,477 | 11/1994 | Semiatin et al. | 29/423 |

FOREIGN PATENT DOCUMENTS 1-246521  10/1989  Japan .

*Primary Examiner*—Stanley S. Silverman
*Assistant Examiner*—Sean Vincent
*Attorney, Agent, or Firm*—Milton M. Peterson

[57] ABSTRACT

A method of producing a sintered glass article from a fritted glass body, and preventing the body from adhering to a refractory carrier during the sintering step which comprises coating the refractory carrier with a thin, continuous layer of yttrium oxide.

14 Claims, No Drawings

METHOD OF PREVENTING GLASS ADHERENCE

This application claims the benefit of U.S. Provisional Application No. 60/028738, filed Oct. 24, 1996.

FIELD OF THE INVENTION

Method of preventing a glass body from adhering to a carrier member while the body is being sintered.

BACKGROUND OF THE INVENTION

Sintering is a conventional practice in the ceramic art. It involves molding a body from ceramic particles, and heating the molded body to consolidate and impart strength to the body. Sintering is thought to involve incipient softening at contact points of the particles. This provides adherence, as the body cools, without complete melting, as occurs with a glass batch.

Sintering is less commonly practiced in the glass art. However, it does find application, for example, in forming articles having shapes that do not lend themselves to the direct molding of molten glass. The usual practice is to melt a glass and quench the molten glass to shatter it into small pieces. Also a formed body may be subjected to grinding. The glass pieces are then further reduced to a desired particle size by a process such as milling. This produces what is known as glass frit. The fit can then be molded in accordance with ceramic practice, e.g. after spray drying.

The glass frit may be dry-molded, that is, plasticized, placed in a mold, and subjected to pressure. Alternatively, the frit may be mixed with a vehicle and binder to form a dough or paste. This may be molded by such means as casting, pressing, or extrusion. The molded body is then fired to remove the vehicle and binder. This may be incorporated in the sintering step, or may be a separate step.

The sintering step may simply provide incipient softening at contact points as in ceramic materials. Where a solid, non-porous product is required, a somewhat higher temperature may be employed. This coalesces the particles to form a non-porous glass body without softening the glass and deforming the shape of the body.

The present invention finds general application in producing sintered glass bodies. However, it was developed to facilitate production of gun mounts. A gun mount is a rectangular glass body molded from an insulating glass frit. It has specific dielectric properties that make it useful in cathode ray tubes. The mount is sealed in the neck of the cathode ray tube in conjunction with electrodes to form the gun. Accordingly, the invention is described with reference to that article.

It is a purpose of the present invention to provide an improved method of sintering a flitted glass body without distorting electrical properties or dimensions of the body. It is a further purpose of the invention to provide a method of preventing adherence of a flitted glass body to a refractory carrier while the body is being sintered. Another purpose is to avoid using a parting agent between a glass body and a carrier during a heat treatment of the body.

SUMMARY OF THE INVENTION

The invention resides in a method of preventing a flitted glass body from adhering to a refractory carrier while the glass body is being conveyed through a heating unit to sinter the body to a non-porous condition, the method comprising coating at least the upper surface of the refractory carrier with a thin, continuous layer of yttrium oxide.

The invention further resides in a method of producing a sintered, fritted glass article which comprises, a. forming a glass frit into a fritted glass body of desired shape, b. coating at least the carrying surface of a refractory carrier member with a thin, continuous layer of yttrium oxide, c. placing the shaped glass body on the coated refractory carrier member, and d. conveying the glass body on the carrier member through a heating unit to sinter the fritted glass body to a non-porous glass article.

PRIOR ART

Literature of possible interest is described in a separate paper.

DESCRIPTION OF THE INVENTION

The invention arose from efforts to correct problems encountered in the production of sintered glass articles, in particular, gun mounts for cathode ray tubes. The sintering procedure involved conveying a fritted glass body through a lehr operating at an elevated temperature. The temperature in the lehr reached a maximum value of about 100° C. above the glass softening temperature. This was necessary to secure coalescence of the glass particles.

The fritted glass body was placed on a refractory substrate for the trip through the lehr. It was, of course, necessary to provide a parting agent on the substrate to prevent adherence of the glass body to the substrate. The parting agent was required to form a hard layer that did not stick to the edges of the glass body being fired. Also, it had to adhere firmly to the substrate, and not spall or flake off.

It was known that a hard coating of silica could be employed as a parting agent. To promote adherence to, and act as a diffusion barrier on, the refractory substrate, an initial film of zirconia was applied to the substrate. The film was applied by coating the substrate with a solution of a zirconium salt and firing the coated substrate to produce an adherent oxide film.

When this practice was adopted, performance was spotty. Thus, particles of silica would adhere to the rim of the gun mount on occasion. Of more concern, however, was sticking of the mount to the substrate. This required that both bodies be discarded. These problems became increasingly severe with time. Ultimately, it became necessary to replace the set of refractory substrates after no more than about 50 cycles.

We have now found an oxide film that has a substantially longer life than the zirconia-silica combination just described. It is simpler to prepare, and provides higher, and more consistent, yields of acceptable sintered ware during its life. Furthermore, old carriers can be cleaned and recoated for use.

The new diffusion barrier is an adherent, thin film of yttrium oxide. It is applied in liquid form to the substrate, and is hardened by passing the painted substrate through the lehr at a temperature of about 950° C. The film may be produced employing paints available from ZYP Coatings, Incorporated, P.O. Box 208, Oak Ridge, Tenn., 37831, or by applying yttrium salt solutions.

The invention is further described with reference to a specific embodiment, namely, a gun mount for a cathode ray tube. This is a fritted glass article produced by sintering a body molded from a potassium borosilicate glass frit. The glass has the following composition in percent by weight and relevant physical properties:

| | |
|---|---|
| $SiO_2$ | 79.1 |
| $B_2O_3$ | 18.1 |
| $K_2O$ | 2.8 |
| Soft. Pt. | 820° C. |
| Ann. Pt. | 570° C. |
| CTE | $28 \times 10^{-7}$/°C. |

A glass batch was formulated, mixed, and melted at 1500°±30° C. The glass melt was poured into cold water to quench the glass and shatter it. Alternatively, it could be drawn and crushed. The fractured glass was then milled to an average particle size of about 90 microns. The glass frit was mixed with a binder system based on Na stearate. This produces a coherent flit mixture which was spray dried to produce particles having an average particle size of about 230 microns. The particles adhered well to each other when dry pressed and had little tendency to stick to the mold.

The spray dried powder was pressed into the desired shape for a gun mount. The pressed body was then placed on a flat carrier plate of the ceramic, cordierite (2 MgO-2 $Al_2O_3$-5 $SiO_2$). Prior to placing the pressed mount on the plate, the plate was coated with a diffusion barrier. In accordance with the present invention, this is an yttrium oxide paint applied as a continuous layer over the plate surface. The plate was then passed through a sintering cycle in the lehr. This sets an yttrium oxide film having a thickness of at least about 20 microns. The plate was now ready for service.

As noted earlier, the time-temperature cycle for the lehr is about 65 minutes with a maximum temperature of 945° C. being reached, but not held.

We claim:

1. In a method of preventing a fritted glass body from adhering to a refractory carrier while the glass body is being conveyed through a heating unit to sinter it to a non-porous condition, the improvement comprising coating at least the upper surface of the refractory carrier with a thin, continuous layer of yttrium oxide wherein the yttrium oxide layer prevents the fritted glass body from adhering to the refractory carrier member.

2. A method in accordance with claim 1 which comprises forming a slurry of an yttrium source and applying the slurry to the surface of the refractory carrier.

3. A method, in accordance with claim 1 which comprises forming a layer of yttrium oxide having a thickness of at least 20 microns.

4. A method in accordance with claim 1 which comprises coating the upper surface of a glass-ceramic carrier.

5. A method in accordance with claim 4 which comprises coating the upper surface of a cordierite glass-ceramic carrier.

6. A method in accordance with claim 1 which comprises forming the fritted glass body from a borosilicate glass.

7. A method of producing a sintered, fritted glass article which comprises a. forming a glass frit into a fritted glass body of desired shape, b. coating at least the carrying surface of a refractory carrier member with a thin, continuous layer of yttrium oxide, c. placing the shaped glass body on the coated refractory carrier member, and d. conveying the glass body on the carrier member through a heating unit to sinter the fritted glass body into a non-porous glass article wherein the yttrium oxide layer prevents the fritted glass body from adhering to the refractory carrier member.

8. A method in accordance with claim 7 which comprises forming a borosilicate glass frit into a fritted glass body of desired shape.

9. A method in accordance with claim 7 which comprises forming the glass frit into a fritted glass mount for the electron gun in a cathode ray tube.

10. A method in accordance with claim 7 which comprises coating the carrying surface of a glass-ceramic carrier member.

11. A method in accordance with claim 10 which comprises coating the carrying surface of a cordierite carrier member.

12. A method in accordance with claim 7 which comprises forming a slurry of yttrium oxide and applying the slurry over the carrying surface of the refractory carrier.

13. A method in accordance with claim 7 which comprises sintering the coating on the carrying surface prior to placing a glass body on the carrier.

14. A method in accordance with claim 7 which comprises coating the carrying surface of the carrier member with an yttrium oxide coating having a thickness of at least 20 microns.

* * * * *